United States Patent [19]
Rigsby

[11] Patent Number: 5,385,325
[45] Date of Patent: Jan. 31, 1995

[54] ADJUSTABLE CONTAINER HOLDER
[76] Inventor: Kenneth D. Rigsby, 7911 Dunbarton Ave., Los Angeles, Calif. 90045
[21] Appl. No.: 88,223
[22] Filed: Jul. 6, 1993
[51] Int. Cl.6 .............................................. A47K 1/08
[52] U.S. Cl. .................................. 248/313; 224/42.43; 224/42.45 R; 248/311.2
[58] Field of Search ................. 248/311.2, 313, 316.4, 248/154; 224/42.43, 42.45 R, 275, 281, 282; 297/194; 108/26, 44, 45

[56] References Cited
U.S. PATENT DOCUMENTS

| | | |
|---|---|---|
| D. 331,175 | 11/1992 | Jones et al. . |
| 2,321,824 | 6/1943 | Knight .................... 248/154 |
| 4,693,440 | 9/1987 | LaLonde . |
| 4,783,037 | 11/1988 | Flowerday . |
| 4,828,211 | 5/1989 | McConnell et al. . |
| 4,892,281 | 1/1990 | DiFilippo ..................... 248/316.4 X |
| 4,943,111 | 6/1990 | Vanderlaan . |
| 4,948,080 | 8/1990 | Jack ................................ 248/311.2 |
| 4,981,277 | 1/1991 | Elwell . |
| 4,984,722 | 1/1991 | Moore . |
| 5,007,610 | 4/1991 | Christiansen .................... 248/313 X |
| 5,024,411 | 6/1991 | Elwell . |
| 5,033,709 | 7/1991 | Yuen ............................ 248/316.4 X |
| 5,054,733 | 10/1991 | Shields ............................. 248/154 X |
| 5,060,899 | 10/1991 | Lorence .................... 224/42.45 R X |
| 5,071,096 | 12/1991 | Hartman ............................ 248/154 |
| 5,072,909 | 12/1991 | Huang . |
| 5,104,185 | 4/1992 | Christiansen et al. . |
| 5,143,338 | 9/1992 | Eberlin ............................. 248/313 |
| 5,149,032 | 9/1992 | Jones et al. . |
| 5,154,380 | 10/1992 | Risca . |
| 5,167,392 | 12/1992 | Henricksen . |
| 5,195,711 | 3/1993 | Miller ............................ 248/313 |

Primary Examiner—J. Franklin Foss
Attorney, Agent, or Firm—Ashok K. Janah

[57] ABSTRACT

An adjustable container holder has a housing having an opening therethrough, and first and second jaws within the housing. The jaws have mutually opposed arcuate surfaces that define an adjustable aperture substantially aligned with the opening in the housing. Adjusting means within the housing can move the first and second jaws toward and apart from one another, so that the adjustable aperture defined by the arcuate jaw surfaces can be adjusted to grasp containers of differing sizes.

12 Claims, 3 Drawing Sheets

ADJUSTABLE CONTAINER HOLDER

The present invention relates to an adjustable container holder for holding containers of differing sizes.

Container holders are used in moving vehicles and the like, to hold containers such as cups, mugs and beverage cans, so that the contents of the containers do not spill while the vehicle is in transit. These containers are typically held within apertures in the holders. Since the containers often have differing diameters and sizes, container holders that have fixed sized apertures cannot securely grasp many types of containers.

Adjustable container holders were developed to hold containers having differing sizes. However, existing adjustable container holders have many disadvantages. Some holders are adjustable only in fixed increments corresponding to the sizes of common beverage containers, and are unable to securely grasp containers having unusual or uncommon sizes. Other holders are bulky and occupy excessive space in small vehicles. Another disadvantage of many holders is that the user has to use both hands to operate the adjusting mechanism, which is difficult to do when the vehicle is in motion.

Thus, an adjustable container holder that can securely grasp containers having differing and uncommon sizes, that has a thin streamlined design, and that can be operated by a single hand is desirable.

SUMMARY

The present invention satisfies these needs. An adjustable container holder of the present invention comprises a housing having an opening therethrough. First and second jaws within the housing have mutually opposed arcuate surfaces that define an adjustable aperture, the aperture substantially aligned with the opening in the housing. Either the first jaw is movable and the second jaw fixed, or the first and second jaws are both movable. Adjusting means within the housing can move the first and second jaws toward and apart from one another, so that the adjustable aperture defined by the arcuate jaw surfaces can be adjusted to grasp containers of differing sizes.

Preferably, the first jaw has a pair of spaced apart holes having a first thread therethrough, and the second jaw has a pair of spaced apart holes having a second thread therethrough, the second thread being opposite in direction to the first thread. Preferably, the adjusting means comprises spaced apart, parallel, and opposing front and rear support members, and a pair of threaded rods rotably attached at their ends to the front and rear support members. The rods have forward portions threaded in the same direction as the first thread in the first jaw holes, and rearward portions threaded in the same direction as the second thread in the second jaw holes. The forward portions of the rods engage the holes in the first jaw, and the rearward portions engage the holes in the second jaw. An adjusting knob engaging the two rods is capable of rotating both rods, so that adjustment of the knob in one direction causes the first and second jaws to move toward one another, and adjustment of the knob in the other direction causes the first and second jaws to move apart from one another.

DRAWINGS

These and other features, aspects and advantages of the present invention will become better understood with regard to the following description, appended claims, and accompanying drawings, where:

DESCRIPTION

Figure 1:
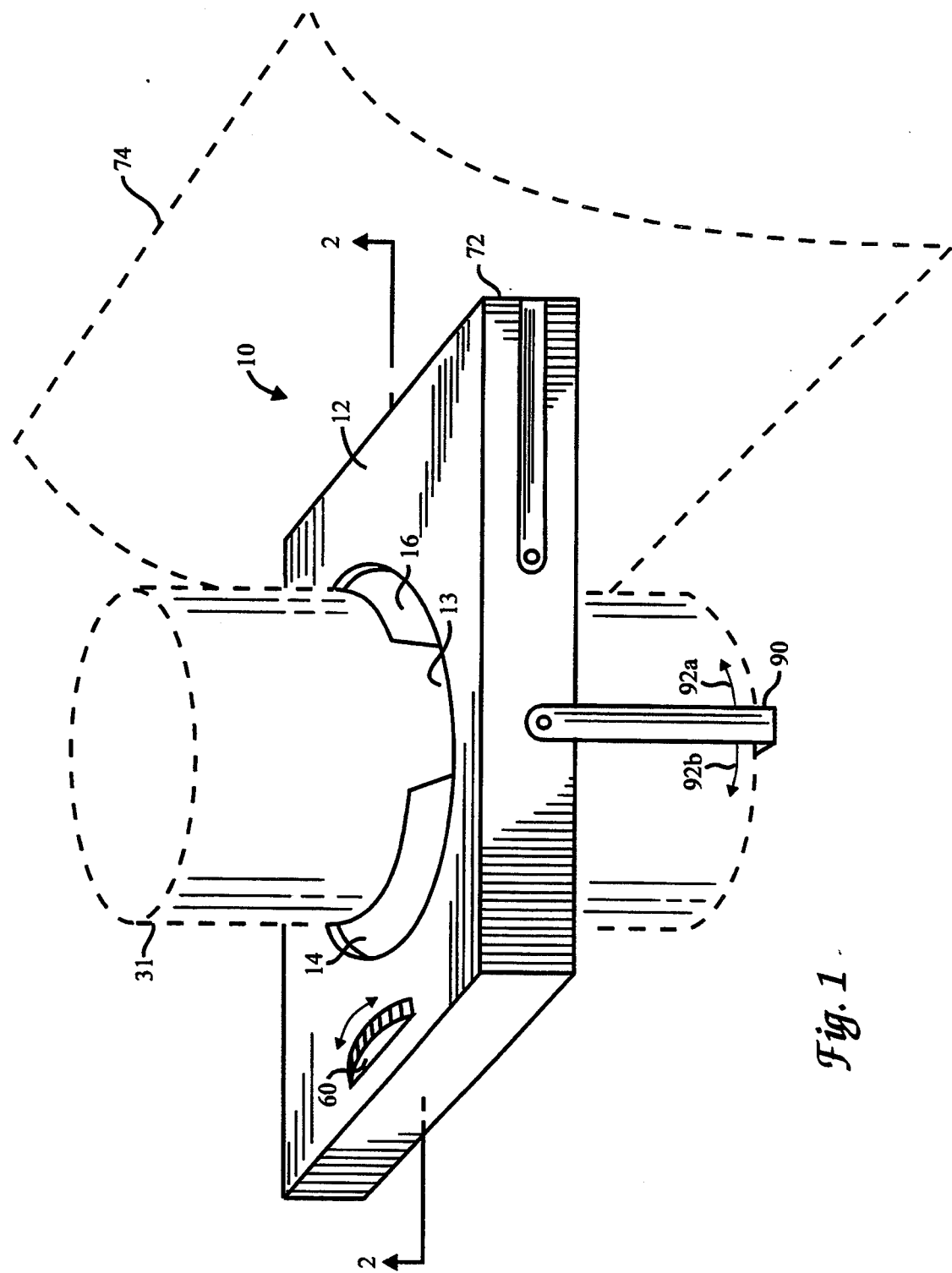
FIG. 1 is a perspective view of an adjustable container holder of the present invention with a container held therein.
Figure 2:
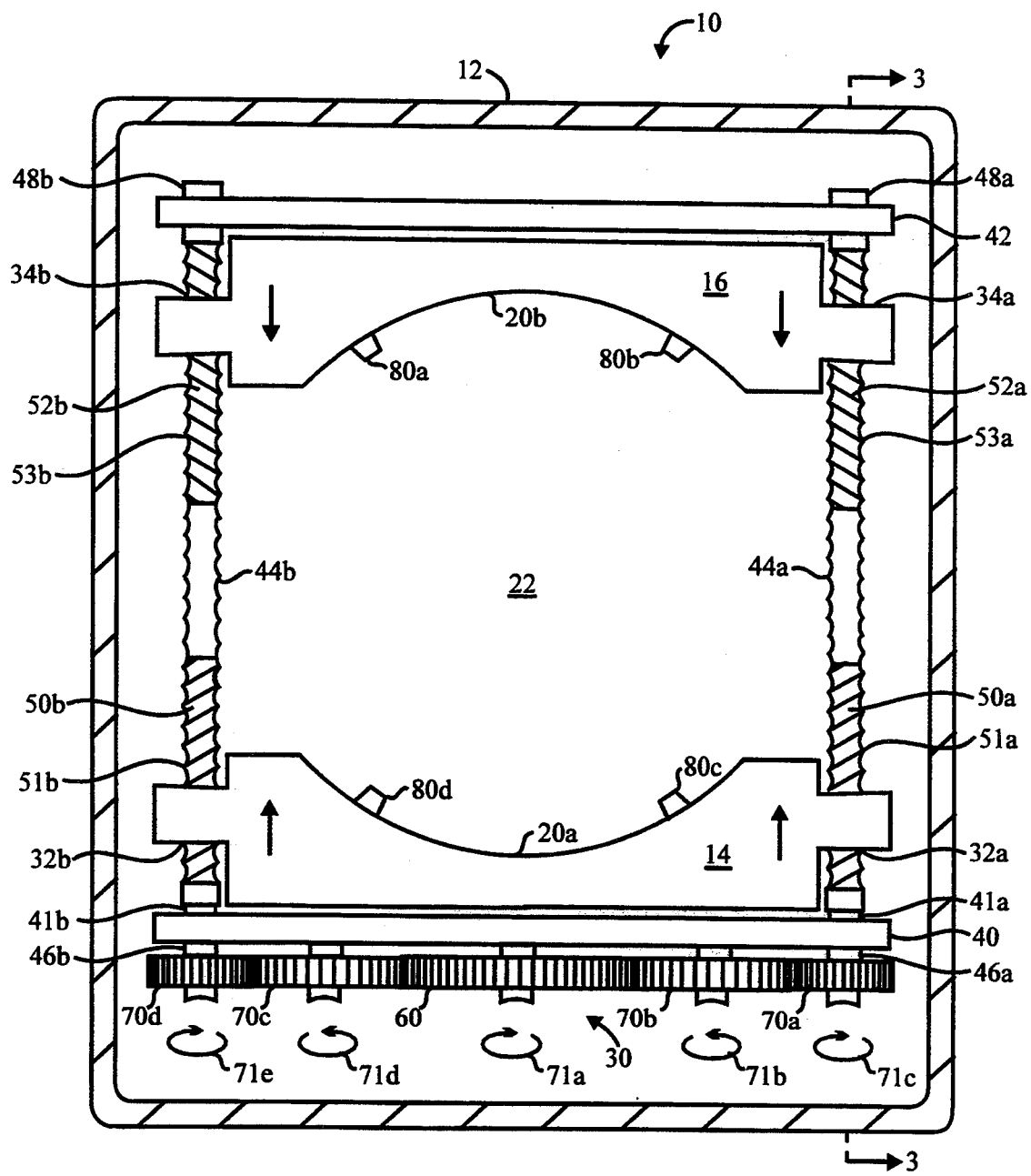
FIG. 2 is a top elevation partial sectional view of the container holder of FIG. 1, taken along line 2—2 of FIG. 1.
Figure 3:
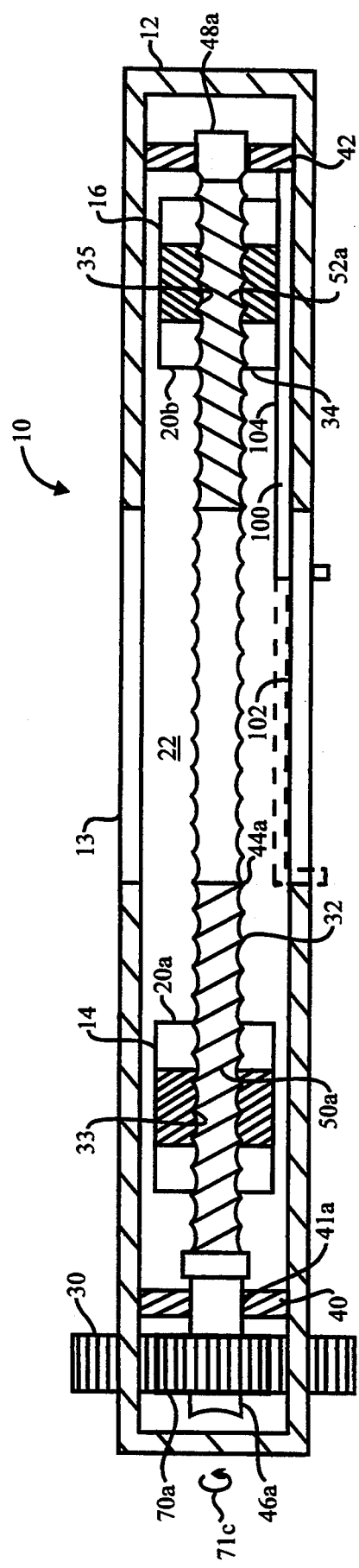
FIG. 3 is a side elevation partial sectional view of the container holder of FIG. 1, taken along line 3—3 of FIG. 2.

An adjustable container holder 10 of the present invention comprises a housing 12 with an opening 13 therethrough. A first jaw 14 and a second jaw 16 are within the housing 12. The first jaw 14 and second jaw 16 have mutually opposed arcuate surfaces 20. The arcuate surfaces 20 define an adjustable aperture 22 that is substantially aligned with the opening 13 in the housing 12. An adjusting means or mechanism 30 within the housing 12 allows movement of the first jaw 14 and second jaw 16 toward and apart from one another, so that the aperture 22 defined by the arcuate jaw surfaces 20 can be adjusted to grasp containers 31 of differing sizes.

In one version of the invention, the first jaw 14 is movable and the second jaw 16 is fixed. In this version, the aperture 22 is adjusted by moving the first jaw 14 toward or apart from the second jaw 16. In another version of the invention, the first jaw 14 and second jaw 16 are both movable, and the adjusting mechanism 30 causes the first jaw 14 and second jaw 16 to simultaneously move toward and apart from one another.

When the first jaw 14 and second jaw 16 are both movable, preferably, the first jaw 14 has a pair of spaced apart holes 32 therethrough, the holes 32 having a first thread 33 therethrough, and the second jaw 16 has a pair of spaced apart holes 34 therethrough, the holes 34 having a second thread 35 therethrough. The second thread 35 is in the opposite direction to the first thread 33. Thus, when the first thread 33 is a left-to-right thread, the second thread 35 is a right-to-left thread. Conversely, when the first thread 33 is a right-to-left thread, the second thread 35 is a left-to-right thread.

Preferably, the adjusting means 30 comprises a front support member 40 and a rear support member 42 within the housing 12. The support members 40 and 42 are spaced apart and parallel and oppose one another. Preferably, the support members are mounted at their end of the housing 12.

A pair of threaded rods 44 are rotably attached at one of their ends 46 to the front support member 40, and are rotably attached at their other ends 48 to the rear support member 42, so that the rods 44 are substantially perpendicular to the support members 40 and 42. The rods 44 each have a forward portion 50 with a thread 51 thereon, and a rearward portion 52 with a thread 53 thereon. The thread 51 on the forward portions 50 of the rods 44 is in substantially the same direction as the first thread 33 of the holes 32 in the first jaw 14. The thread 53 of the rearward portions 52 of the rods 44 has the same direction as the second thread 35 of the holes 34 of the second jaw 16.

The forward portions 50 of the rods 44 engage the threaded holes 32 in the first jaw 14, and the rearward portions 52 of the rods 44 engage the threaded holes 34 in the second jaw 16. When the rods 44 are rotated, the first jaw 14 and the second jaw 16 move either towards one another or apart from one another depending on the direction the rods 44 are rotated, because the thread 51 on the forward portions 50 of the rods 44 is opposite in direction to the thread 53 on the rearward portions 52 of the rods 44.

An adjusting knob 60 engages the two rods 44 so that adjustment of the knobs 60 causes the rods 44 to rotate, thereby adjusting the aperture 22 between the arcuate surfaces 20 of the jaws 14 and 16 to accommodate containers 31 having differing sizes.

The adjusting knob 60 can engage the rods 44 through a plurality of gears 70. The gears 70 are preferably rotably attached to the first support member 40. The ends 46 of the rods 44 extend through the holes 41 in the front support member 40 and are attached to the gears 70a and 70d. Preferably, the gears 70 comprise at least four gears. The gears 70 can all have the same number of teeth and have the same diameter, or the gears 70 can have different numbers of teeth and have different diameters. When the adjusting knob 60 is rotated in the direction shown by the arrow 71a, the gears 70 rotate in the directions shown by the arrows 71b, 71c, 71d and 71e as shown.

Alternatively (not shown), the adjusting knob 60 can also engage the two rods 44 through a plurality of pulleys rotably attached to the front support member 40, with a belt connecting the pulleys to the adjusting knob 60. The pulleys would replace the gears 70.

Preferably, the adjustable container holder 10 is sized so that the holder 10 can be retracted into a slot 72 in the interior 74 of a vehicle, and preferably, a retractor assembly 76 can be used for extending and retracting the holder 10 from a slot 72 in the vehicle. The retractor assembly 76 can be mounted on the side of the housing 12, as shown in FIG. 1.

Preferably, the arcuate surfaces 20 of the first jaw 14 and the second jaw 16 have a plurality of rubber tips 80 mounted thereon, so that the container 31 within the aperture 22 can be securely grasped.

Preferably, the holder 10 can also comprise a base 90 for supporting a container 31. The base 90 can be pivotably attached to the housing 12 as shown in FIG. 1, so that the base 90 can be extended outwardly from the housing 12 to support the container 31. The arrows 92 show the direction of movement of the base 90. Alternatively, the holder 10 can comprise a retractable support plate 100 mounted in the bottom of the housing 12, the plate 100 having an extended position 102 in which the plate extends below the adjustable aperture 22 so that the plate 100 can support a container 31 grasped in the aperature, and a retracted position 104 in which the plate 100 retracts into the housing 12.

Preferably, all the components of the holder 10 are die cast from a polymeric material such as plastic. The use of polymeric materials precludes rusting of the components of the holder 10. Die casting is a convienient method of fabricating the components. Alternatively, some or all of the components can be made from a metal such as steel, aluminium or from metallic alloys.

Although the present invention has been described in considerable detail with regard to the preferred version thereof, other versions are possible. Therefore, the appended claims should not be limited to the description of the preferred versions contained herein.

What is claimed is:

1. An adjustable container holder comprising:
   a) a housing having an opening therethrough;
   b) movable first and second jaws within the housing, the jaws having mutually opposed arcuate surfaces that define an adjustable aperture, the aperture substantially aligned with the opening in the housing; and
   c) an adjusting knob movably mounted in the housing, the knob engaging the first and second jaws, wherein adjustment of the knob in one direction causes the first and second jaws to simultaneously move toward one another, and adjustment of the knob in the opposing direction causes the first and second jaws to simultaneously move apart from one another, so that the adjustable aperture defined by the arcuate jaw surfaces can be adjusted to grasp containers of differing sizes.

2. The holder of claim 1, wherein the first jaw has a pair of spaced apart holes having a first thread therethrough, and the second jaw has a pair of spaced apart holes having a second thread therethrough, the second thread being opposite in direction to the first thread, and wherein the holder further comprises:
   a) spaced apart, parallel, and opposing front and rear support members;
   b) a pair of threaded rods rotably attached at their ends to the front and rear support members, the rods having forward portions threaded in the same direction as the first thread, and rearward portions threaded in the same direction as the second thread, the forward portions engaging the holes in the first jaw, and the rearward portions engaging the holes in the second jaw; and
   c) means for engaging the adjusting knob to the two rods so that the knob is capable of simultaneously rotating both rods.

3. The holder of claim 2, wherein the adjusting knob is rotably attached to the first support member, and wherein the knob engages the pair of rods through a plurality of gears rotably attached to the front support member.

4. The holder of claim 2, wherein the adjusting knob is rotably attached to the first support member, and wherein the knob engages the pair of rods through a plurality of pulleys rotably attached to the first support member, the pulleys and the knob connected by a belt.

5. The holder of claim 1, wherein the holder is sized to be retracted into a slot in the interior of a vehicle, and wherein the holder further comprises a retractor assembly adapted for extending and retracting the holder from the slot in the vehicle.

6. The holder of claim 1, further comprising a base for supporting a container, the base pivotably attached to the housing so that the base can be extended outwardly from the housing to support a container.

7. The holder of claim 1, further comprising a retractable support plate mounted in the housing, the plate having an extended position in which the plate extends below the adjustable aperture so that the plate can support a container grasped in the aperature, and a retracted position in which the plate retracts into the housing.

8. The holder of claim 1, further comprising a plurality of rubber tips for securely grasping containers, the rubber tips mounted on the arcuate surfaces of the first and second jaws.

9. An adjustable container holder comprising:
   a) a housing having an opening therethrough;
   b) first and second jaws within the housing, the jaws having mutually opposed arcuate surfaces that define an adjustable aperture substantially aligned with the opening in the housing, the first jaw having a pair of spaced apart holes with a first thread therethrough, and the second jaw having a pair of spaced apart holes with a second thread therethrough, the second thread being opposite in direction to the first thread;

c) spaced apart, parallel, and opposing front and rear support members within the housing;

d) a pair of threaded rods rotably attached at their ends to the front and rear support members, the rods having forward portions threaded in the same direction as the first thread, and rearward portions threaded in the same direction as the second thread, the forward portions engaging the holes in the first jaw, and the rearward portions engaging the holes in the second jaw;

e) a plurality of gears rotably attached to the front support member, the gears engaging the two rods; and f) an adjusting knob rotably attached to the first support member, the knob engaging the gears so that adjustment of the knob causes both rods to rotate, wherein adjustment of the knob in one direction causes the first and second jaws to move toward one another, and adjustment of the knob in the other direction causes the first and second jaws to move apart from one another.

10. The holder of claim 9, wherein the holder is sized to be retracted into a slot in the interior of a vehicle, and wherein the holder further comprises a retractor assembly adapted for extending and retracting the holder from the slot in the vehicle.

11. The holder of claim 9, further comprising a base for supporting a container, the base pivotably attached to the housing so that the base can be extended outwardly from the housing to support a container.

12. The holder of claim 9, further comprising a retractable support plate mounted in the housing, the plate having an extended position in which the plate extends below the adjustable aperture so that the plate can support a container grasped in the aperature, and a retracted position in which the plate retracts into the housing.

* * * * *